No. 822,361. PATENTED JUNE 5, 1906.
J. A. GILES.
CONNECTING ROD.
APPLICATION FILED AUG. 25, 1903.
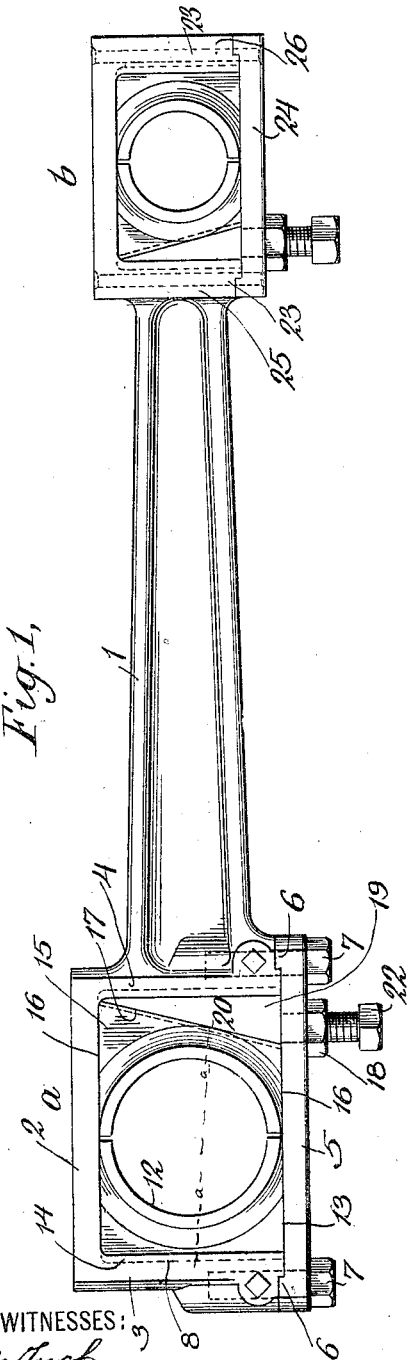
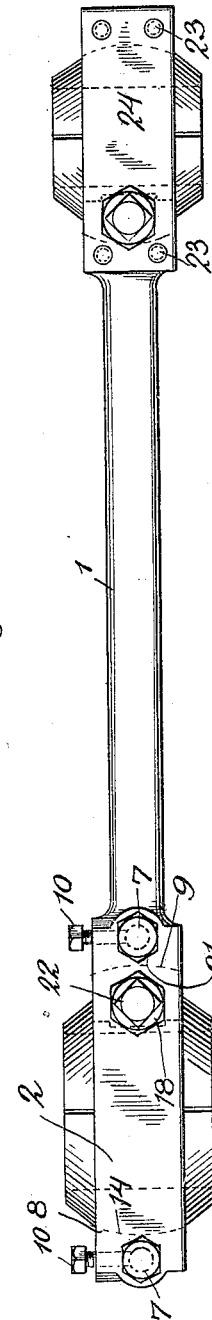
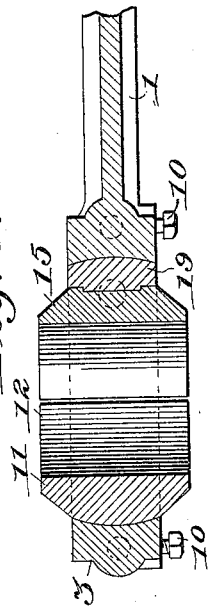
INVENTOR
BY
ATTORNEY

UNITED STATES PATENT OFFICE.

JULIAN A. GILES, OF NEW YORK, N. Y.

CONNECTING-ROD.

No. 822,361.      Specification of Letters Patent.      Patented June 5, 1906.

Application filed August 25, 1903. Serial No. 170,740.

*To all whom it may concern:*

Be it known that I, JULIAN A. GILES, a citizen of the United States of America, and a resident of the city, county, and State of New York, have invented certain new and useful Improvements in Connecting-Rods, of which the following is a specification.

My invention relates to connecting-rods for crank motions, such as are ordinarily used in steam and gas engines, pumps, &c., and has for its object to provide a connecting-rod which shall be simple and effective in its construction and operation, one which shall be especially adapted to avoid the undesirable results which follow from lack of alinement of the parts, and at the same time one which is especially adapted for cheapness and ease of manufacture.

My invention consists in making a rod proper of any approved form and material and in forming in the end or ends of said rod rectangular openings, three sides of which are preferably made integral with the rod proper, while the remaining side is closed by a piece rigidly secured, in making the ends of said opening cylindrically concave, in forming brasses or bearing members adapted to fit in said opening, having plane and cylindrical faces adapted to fit, respectively, the plane and cylindrical faces of said opening, in providing means for adjusting said bearings to take up wear without changing the relation of the cylindrical surfaces at the ends of said rectangular openings, and in other novel features of construction to be hereinafter more fully pointed out and described.

In the drawings accompanying and forming part of this specification, Figure 1 is a side view, Fig. 2 an edge view, of a preferred form of my invention; and Fig. 3 is a section on line *a a* of Fig. 1.

The reference characters are used in the same sense in the drawings and the specification.

Numeral 1 represents the rod proper, connecting the crank-pin end *a* with the cross-head end *b*.

2 represents the longitudinal and 3 the end portions of the strap, which is preferably made integrally with the rod to which it is joined at the butt-end 4.

5 is a link provided with the shoulder 6, which joins the free end of the strap with the butt 4.

7 represents bolts which secure the link 5 to the butt-end of the rod and to the end of the strap 3.

8 represents a concave cylindrical face of the strap 3, and 9 represents a corresponding concave cylindrical face in the butt-end 4.

10 represents set-screws for the purpose of locking the bolts 7.

11 represents the outer or end brass or bearing for the crank-pin, and it is provided with the semicylindrical bearing-surface 12, which fits the crank-pin, the plane sides 13, and the cylindrical end 14, which engages the concave cylindrical face 8 of the strap 3.

15 represents the inner brass, and it is provided with the plane surfaces 16 and the inclined face 17, which face is preferably provided with a groove 18, adapted to fit a corresponding tongue on the gib 19. The gib 19 has an inclined face 20, adapted to engage the inclined face 17 of the brass 15, and a cylindrical face 21, adapted to engage the cylindrical face 9 of the butt-end of the rod.

22 is an adjusting-bolt threaded in the link 5 and engaging the end of the gib 19 for the purpose of adjusting the brasses.

The cylindrical faces 8 and 9 are concentric, and the center of the cylinder lies in the center line of the connecting-rod, as seen in Fig. 2.

It is thus seen that in case the axis of the crank-pin should deviate from a direction exactly at right angles to the axis of the connecting-rod, as might happen either through imperfect construction, wear, or deflection in the crank-shaft or crank-pin, that the two brasses and the adjusting-gib by means of the cylindrical surfaces 8 and 9 will be permitted to turn slightly, and thus avoid all undue strain upon the crank-pin or upon the connecting-rod.

The cross-head end of the connecting-rod may be constructed exactly similar to the crank-pin end, or it may be modified by using rivets 23 to secure the link 24 to the butt-end 25 and strap 26, and with this construction when the pin is out of the brasses the brasses may be turned at right angles to their normal position and taken out without removing the link 24. In the case of the crank-pin end this of course would not be possible without removing the crank-pin from the crank, which in most cases would be impracticable.

It will be obvious from the above description that the concave cylindrical surfaces in the ends of the connecting-rod may be bored out or formed at one operation and that the cylindrical surfaces of the brasses and the gibs may be turned in a lathe or other suitable machine at one operation by simply clamping the three parts together in a manner that is well understood.

It will be seen that by means of this construction the brasses are free to rotate in the connecting-rod end in the plane parallel to the axis of the connecting-rod; but they are prevented from changing their angular relation with reference to any other plane, or, in other words, they may rotate on an axis at right angles to the axis of the crank-pin and to the center line of the connecting-rod.

I have used the term "brass" herein to designate the metal bearing-pieces in which the crank and cross-head pins are journaled, this being the term usually employed in the art to designate the pieces which form the bearings proper for the pins. It is of course understood, however, that I do not limit myself to the use of any particular alloy or metal or combination of metal.

It will be observed that by means of my improved construction the cylindrical surfaces 8 and 9 in the rod with which the cylindrical surfaces 14 and 21 of the brass 12 and gib 20, respectively, articulate remain a fixed distance apart, and consequently always concentric for any adjustment of the brasses.

Having thus described my invention, what I claim is—

1. A connecting-rod having a rectangular opening in its end, the sides of said rectangular opening parallel to the axis of the rod being plane, and the sides normal to said axis being cylindrically concave and formed in an integral part of said rod, in combination with brasses adapted to be received into said rectangular opening, and having convex cylindrical surfaces adapted to fit the concave cylindrical surfaces of said rectangular opening, and plane surfaces adapted to fit the plane surfaces of said rectangular opening.

2. A connecting-rod having an opening in its end for the reception of brasses, the longitudinal sides of said opening parallel to the axis of said rod being plane, and the transverse sides thereof being cylindrically concave, one of said longitudinal sides being separate and provided with fastening means whereby said concave cylindrical sides may be accurately formed before said longitudinal side is assembled.

3. A connecting-rod having an opening in its end for the reception of brasses, the sides of said opening parallel to the axis of said rod being plane, and those normal to said axis being cylindrically concave, in combination with brasses adapted to be received in said opening, and means located between the cylindrical sides of said opening for adjusting the distance between said brasses.

4. A connecting-rod provided with an opening in its end for the reception of brasses, said opening having plane longitudinal and cylindrically concave transverse ends, in combination with a brass having a cylindrical end adapted to engage a cylindrical end in said opening, a brass having an inclined back, a gib adapted to engage the inclined back of said brass and provided with a cylindrical surface opposite said brass adapted to engage a cylindrical surface in said opening.

In testimony whereof I have signed my name to this specification in the presence of two subscribing witnesses.

JULIAN A. GILES.

Witnesses:
ELLA LUCE,
CHARLES H. LOVETT.